United States Patent
Hill et al.

(10) Patent No.: US 10,872,281 B2
(45) Date of Patent: Dec. 22, 2020

(54) AIRBAG WITH BAR CODE

(71) Applicant: TRW Vehicle Safety Systems Inc., Washington, MI (US)

(72) Inventors: Bruce R. Hill, Bloomfield Hills, MI (US); Philipp Ritter, Schwaebisch Gmeund (DE)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 0 days.

(21) Appl. No.: 16/163,620

(22) Filed: Oct. 18, 2018

(65) Prior Publication Data
US 2020/0125906 A1 Apr. 23, 2020

(51) Int. Cl.
| | |
|---|---|
| *G06K 19/06* | (2006.01) |
| *B60R 21/213* | (2011.01) |
| *B60R 21/231* | (2011.01) |
| *B60R 21/232* | (2011.01) |
| *B60R 21/237* | (2006.01) |
| *B62D 65/14* | (2006.01) |
| *G06K 1/12* | (2006.01) |

(52) U.S. Cl.
CPC ...... *G06K 19/06028* (2013.01); *B60R 21/213* (2013.01); *B60R 21/232* (2013.01); *B60R 21/237* (2013.01); *B60R 21/23138* (2013.01); *B62D 65/14* (2013.01); *G06K 1/121* (2013.01); *G06K 2019/06253* (2013.01)

(58) Field of Classification Search
CPC ........ B60R 21/213; B60R 2021/21543; B60R 21/23138; G06K 19/06028
See application file for complete search history.

(56) References Cited

U.S. PATENT DOCUMENTS

| | | | | |
|---|---|---|---|---|
| 5,761,995 | A * | 6/1998 | Laiserin | B60R 21/215 |
| | | | | 101/32 |
| 8,523,221 | B2 * | 9/2013 | Muller | B60R 21/201 |
| | | | | 280/730.2 |
| 8,876,150 | B2 | 11/2014 | Min et al. | |
| 9,623,828 | B2 | 4/2017 | Emambakhsh et al. | |
| 10,077,018 | B2 * | 9/2018 | Adams | B60R 21/232 |
| 2007/0145140 | A1 * | 6/2007 | Yoshimura | B60R 21/2171 |
| | | | | 235/462.01 |
| 2014/0099016 | A1 | 4/2014 | Adams et al. | |

FOREIGN PATENT DOCUMENTS

| | | | | |
|---|---|---|---|---|
| DE | 102007003933 A1 * | 10/2007 | ....... | G06K 19/06028 |
| DE | 102016007254 | 12/2017 | | |
| EP | 1978430 | 10/2008 | | |
| JP | 2011059615 | 3/2011 | | |

* cited by examiner

*Primary Examiner* — Faye M Fleming
(74) *Attorney, Agent, or Firm* — Tarolli, Sundheim, Covell & Tummino LLP (57) ABSTRACT

An inflatable vehicle occupant protection device includes a curtain airbag having an upper edge portion for securing to an interior of a vehicle for deployment between a side structure of the vehicle and a vehicle occupant. Indicia extends along the length of the curtain airbag for indicating twisting of the curtain airbag when the curtain airbag is rolled up along its length. The indicia includes a bar code printed on the airbag.

10 Claims, 7 Drawing Sheets

AIRBAG WITH BAR CODE

TECHNICAL FIELD

The present invention relates generally to an apparatus for helping to protect an occupant of a vehicle. More particularly, the present invention relates to indicia for indicating twisting of an inflatable airbag during installation.

BACKGROUND

It is known to inflate an inflatable vehicle occupant protection device to help protect a vehicle occupant in the event of a vehicle collision. Examples of inflatable vehicle occupant protection devices include driver and passenger frontal airbags, side airbags, curtain airbags, inflatable seat belts, inflatable knee bolsters, and inflatable head liners.

Inflatable vehicle occupant protection devices can have a variety of constructions. For example, an inflatable vehicle occupant protection device can be constructed of overlying woven panels that are interconnected by means, such as stitching or ultrasonic welding, to form connections or seams that help define an inflatable volume of the protection device. As another example, an inflatable vehicle occupant protection device can have an OPW construction in which overlying panels are woven simultaneously. The panels are woven together to form connections or seams that help define an inflatable volume of the OPW protection device.

SUMMARY

In one example, an inflatable vehicle occupant protection device includes a curtain airbag having an upper edge portion for securing to an interior of a vehicle for deployment between a side structure of the vehicle and a vehicle occupant. Indicia extends along the length of the curtain airbag for indicating twisting of the curtain airbag when the curtain airbag is rolled up along its length. The indicia includes a bar code printed on the airbag.

In another example, a method of installing an inflatable vehicle occupant protection device in a vehicle includes providing a curtain airbag having a length and indicia extending along the length. The curtain airbag is rolled about an axis. An orientation of the indicia on the rolled curtain airbag relative to the axis is determined. The rolled curtain airbag is installed in the vehicle when the indicia extends parallel to the axis.

Other objects and advantages and a fuller understanding of the invention will be had from the following detailed description and the accompanying drawings.

DETAILED DESCRIPTION

Figure 1:
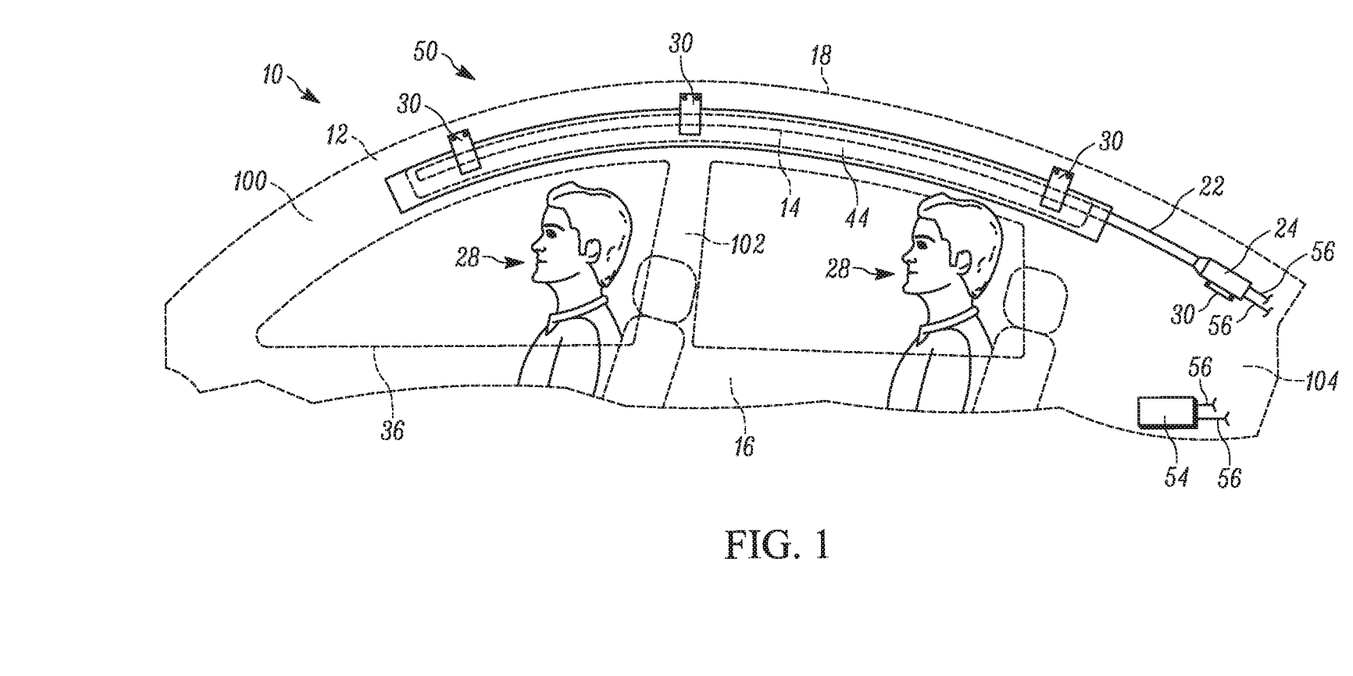
FIG. 1 is a schematic view illustrating a stored condition of an apparatus for helping to protect an occupant of a vehicle, according to the invention.
Figure 2:
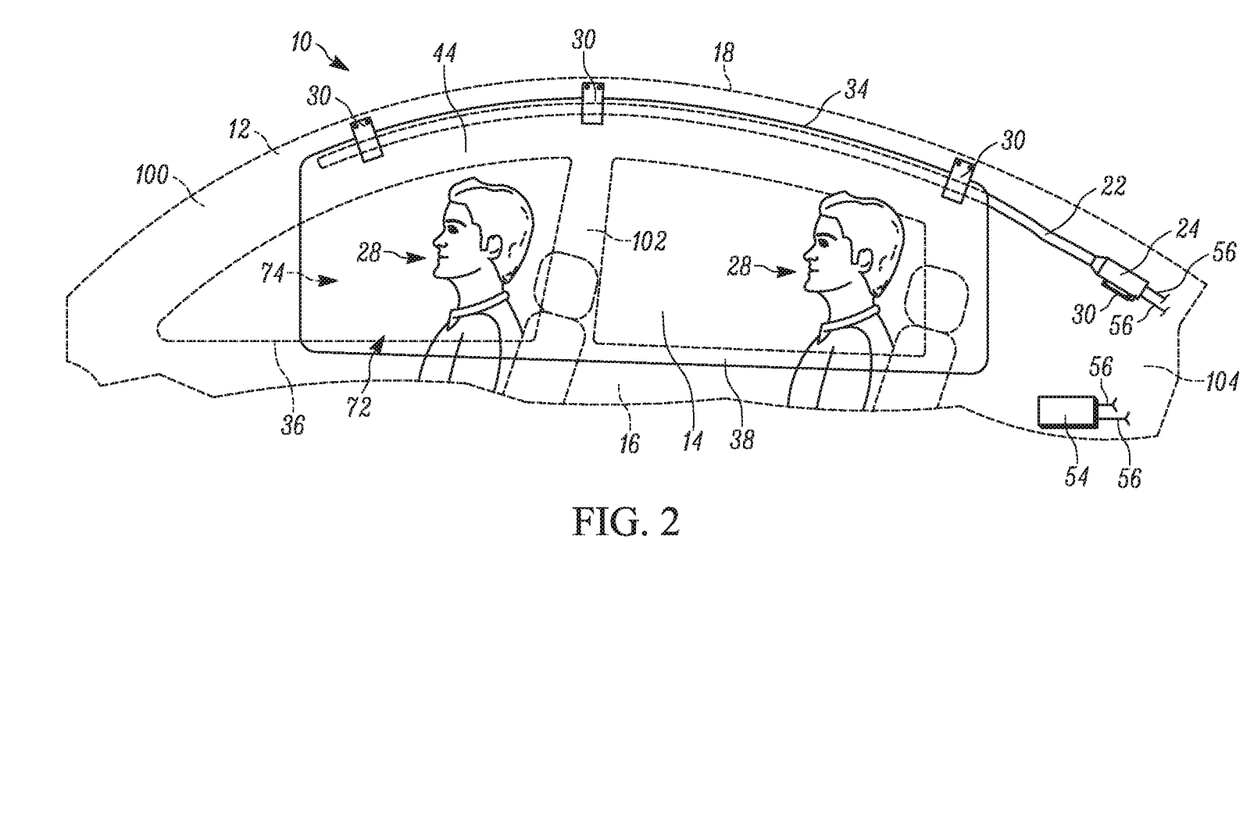
FIG. 2 is a schematic view illustrating a deployed condition of the apparatus of FIG. 1.

The present invention relates generally to an apparatus for helping to protect an occupant of a vehicle. More particularly, the present invention relates to indicia for indicating twisting of an inflatable airbag while being installed. FIGS. 1 and 2 illustrate an apparatus 10 for helping to protect occupants 28 of a vehicle 12. The apparatus 10 includes an inflatable vehicle occupant protection device in the form of an inflatable curtain airbag 14. The inflatable curtain 14 has a stored condition, shown in FIG. 1, in which the deflated curtain is rolled, folded, or rolled and folded, and positioned adjacent the intersection of a side structure 16 and a roof 18 of the vehicle 12. The inflatable curtain 14 is inflatable from the stored condition in a direction away from the roof 18 to a deployed condition shown in FIG. 2.

In the deployed condition, the inflated curtain 14 extends along the side structure 16 and is positioned between the side structure and any occupants 28 of the vehicle 12. The deployed, inflated curtain 14 has an upper edge portion 34 adjacent the roof 18 and a lower edge portion 38 spaced from the upper edge portion positioned adjacent the torso of the occupants 28.

The inflatable curtain 14 can be formed from any suitable material. For example, the inflatable curtain 14 can be formed from a fabric woven with nylon yarns (e.g., nylon 6-6 yarns). Also, the inflatable curtain 14 can have any suitable construction. For example, the inflatable curtain 14 can have a one piece woven (OPW) construction in which the curtain is woven as a single piece of material. As another example, the inflatable curtain 14 can be constructed by interconnecting fabric panels via means, such as stitching, ultrasonic welding, heat bonding, or adhesives.

The inflatable curtain 14 can be uncoated, coated with a material, such as a gas impermeable urethane, or laminated with a material, such as a gas impermeable film. The inflatable curtain 14 thus can have a gas-tight or substantially gas-tight construction. Those skilled in the art will appreciate that alternative materials, such as polyester yarn, and alternatives coatings, such as silicone, can also be used to construct the inflatable curtain 14.

The apparatus 10 also includes an inflation fluid source in the form of an inflator 24. The inflator 24 is actuatable to provide inflation fluid for inflating the inflatable curtain 14. The inflator 24 can be of any suitable construction or configuration. For example, the inflator 24 can contain a stored quantity of pressurized inflation fluid (not shown) in the form of a gas for inflating the inflatable curtain 14. As another example, the inflator 24 could contain a combination of pressurized inflation fluid and ignitable material for heating the inflation fluid, or could be a pyrotechnic inflator that uses the combustion of gas-generating material to generate inflation fluid. As a further example, the inflator 24 could be of any suitable type or construction for supplying a medium for providing inflation fluid for inflating the inflatable curtain 14.

In the embodiment illustrated in FIG. 1, the inflator 24 is connected in fluid communication with the inflatable curtain 14 through a conduit or fill tube 22. The fill tube 22 can be constructed of any suitable material, such as metal, plastic, or fabric. Alternatively, the fill tube 22 can be omitted and inflation fluid could be discharged into the inflatable curtain 14 from the inflator 24 directly or through a manifold.

The fill tube 22 can also have any suitable configuration. For example, the fill tube 22 can extend substantially along the entire length of the inflatable curtain 14, as shown in FIGS. 1 and 2. Alternatively, the fill tube 22 can extend along any portion of the length of the inflatable curtain 14. The portion of the fill tube 22 positioned in the inflatable curtain 14 includes a plurality of openings (not shown) through which inflation fluid is delivered to the curtain.

The apparatus 10 also includes a cover 44 that helps support the inflatable curtain 14 in the stored condition. The cover 44 can have various constructions. For example, the cover 44 can have what is referred to as a "soft pack" construction. In a soft pack construction, the cover 44 can comprise a sheet or panel of material, such as fabric, that is wrapped or otherwise placed around the inflatable curtain 14. In one particular soft pack construction, the cover 44 is configured as a sock, sheath, or tube into which the inflatable curtain 14 and fill tube 22 are placed.

The fabric material used to construct the cover 44 can be a woven material, such as nylon or polyester, a non-woven material, such as a plastic film, or any other suitable material. The cover 44 can be constructed by interconnecting portions of the fabric material using known means, such as an adhesive, stitching, ultrasonic welding, heat bonding, or weaving the cover with an OPW construction.

The apparatus 10 can be assembled for installation in the vehicle 12 as a unit. For example, the apparatus 10 can comprise an inflatable curtain module 50 that includes the inflator 24 connected to the fill tube 22, which is positioned in the rolled or folded inflatable curtain 14 and packaged in the cover 44. The inflatable curtain module 50 is supported in the vehicle 12 by means 30, such as hooks or brackets, which connect the inflatable curtain 14, inflator 24, fill tube 22, cover 44 or any combination thereof, to the vehicle 12. For example, the brackets 30 can encircle and clamp onto the fill tube 22 and portions of the upper edge portion 34 of the inflatable curtain 14 and extend through the openings (not shown) in the cover 44.

Upon sensing the occurrence of an event for which inflation of the inflatable curtain 14 is desired, a sensor 54 provides an actuation signal to the inflator 24 via lead wires 56. Upon actuation of the inflator 24, inflation fluid is directed through the fill tube 22 into the inflatable curtain 14. The inflating curtain 14 ruptures the cover 44 along a tear seam (not shown). The inflatable curtain 14 inflates and deploys under the pressure of inflation fluid provided by the inflator 24 from the stored condition of FIG. 1 to the deployed condition of FIG. 2.

In the deployed condition, the inflatable curtain 14 is positioned between the side structure 16 and any occupants 28 of the vehicle 12. The inflatable curtain 14, when inflated, extends fore and aft in the vehicle 12 along the side structure 16 and can cover portions of an A pillar 100, B pillar 102, and a C pillar 104 of the vehicle. The upper edge portion 34 extends along the intersection of the side structure 16 and the vehicle roof 18. The lower edge portion 38 extends along the side structure 16 adjacent or near a vehicle belt line. An inboard side 72 of the inflatable curtain 14 faces the occupants 28. An outboard side 74 of the inflatable curtain 14 faces the side structure 16 of the vehicle 12 and away from the occupants 28. The inflatable curtain 14 helps absorb impacts with the curtain and helps distribute the energy of impacts throughout a large area of the curtain.

Space can be limited in the tight confines of the vehicle structure along the side structure 16 and roof 18. As such, it can be highly desirable that the size of the inflatable curtain module 50 (referred to herein as "package size") be kept at a minimum One manner of placing the inflatable curtain 14 in the stored condition is using what is referred to as a roll-fold in which the curtain is rolled from the bottom up. When placing the inflatable curtain 14 in the stored condition in this manner, it is be desirable to maintain a tight roll and/or tight fold to help minimize the roll diameter of the curtain. When the inflatable curtain 14 is rolled/folded to be placed in the cover 44, it is desirable to prevent twisting of the curtain. If the inflatable curtain 14 is twisted when secured within the cover 44, deployment of the curtain can be hindered and/or undesirably altered.

Figure 3:
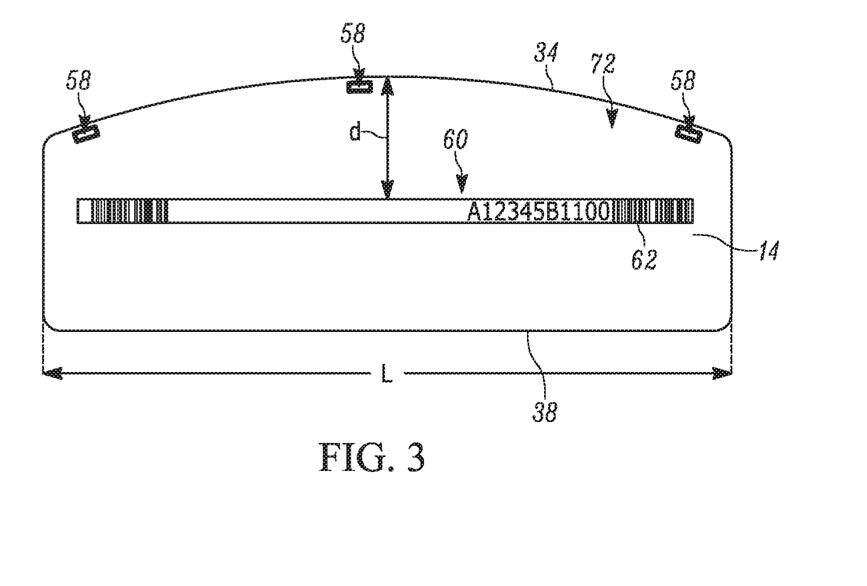
FIG. 3 is a front view of the apparatus of FIG. 1 including indicia.

Referring to FIG. 3, the inflatable curtain 14 includes indicia 60 used to record and/or convey certain information regarding the curtain. The information can, for example, include a serial number, batch number, source information, length L, height, and position (driver side or passenger side of the vehicle 12) for tracking purposes. The indicia 60 can also include optical scanning codes 62, such as a bar code and/or quick response (QR) code that serves as a link for retrieving information related to the inflatable curtain 14.

In the example configuration of FIG. 3, the indicia 60 includes a bar code 62. Advantageously, the indicia 60, particularly the bar code 62, is configured and positioned on the inflatable curtain 14 to allow the installer to immediately recognize when the curtain is twisted during installation. In one example configuration, the indicia 60 (and therefore the bar code 62) is provided on the inboard side 72 of the inflatable curtain 14 closer to the upper edge portion 34 than to the lower end portion 38. More specifically, the indicia 60 is positioned a predetermined distance d from the upper edge portion 34. The distance d is configured such that the portion of the inflatable curtain 14 bearing the indicia 60 is at least partially rolled/folded up during installation. The indicia 60 extends generally along the length L of the inflatable curtain 14. The indicia 60 has a different color than the material of the inflatable curtain 14 so as to be clearly visible and distinguishable from the fabric.

The indicia 60 can be provided on the inflatable curtain 14 by, for example, printing directly on the inboard side 72 and/or the outboard side 76 (not shown). The printing can be done at different times during manufacturing/assembly of the inflatable curtain 14, e.g., at the end of the coating or lamination process, during roll form inspection, just prior to laser cutting the inflatable curtain or in between the camera bank and the laser cutter.

Figure 4A:
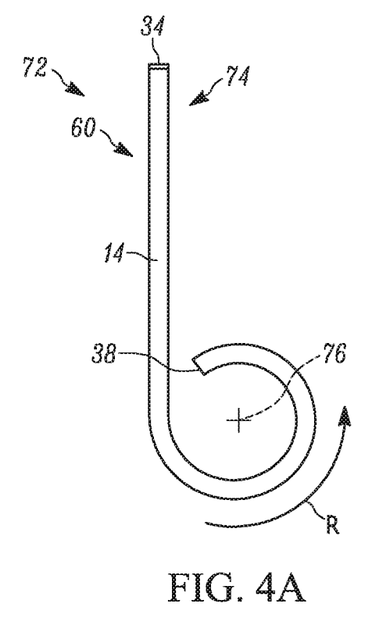
FIG. 4A is a side view of the apparatus of FIG. 3 during rolling.

In any case, once the inflatable curtain 14 is formed and the indicia 60 printed thereon, the curtain is rolled/folded from the lower edge portion 38 towards the upper edge portion 34. Referring to FIG. 4A, the lower edge portion 38 is rolled in the counterclockwise manner R about an axis 76 towards the upper edge portion 34. The inflatable curtain 14 is therefore rolled on its outboard side 76—opposite the inboard side 74 on which the indicia 60 is printed. It will be appreciated that the indicia 60 could be provided on the outboard side 76 and the inflatable curtain 14 inboard rolled (not shown).

Figure 4B:
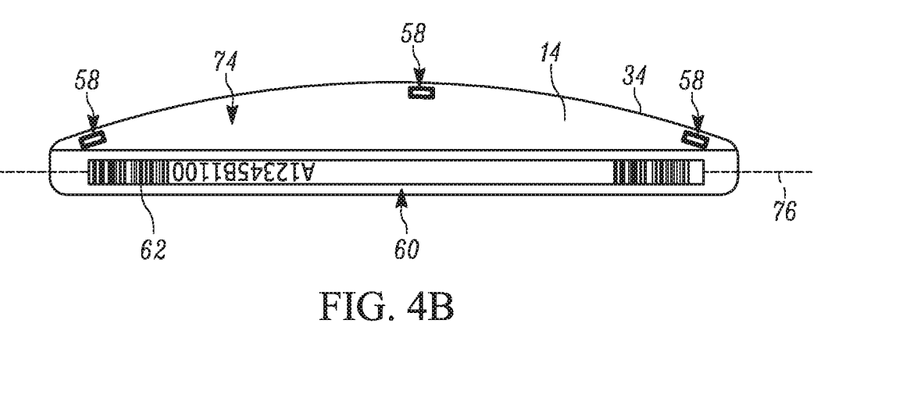
FIG. 4B is a front view of the rolled apparatus in an untwisted condition.

Regardless, it is desirable to roll the inflatable curtain 14 without twisting and, thus, the orientation of indicia 60 during/after rolling helps notify the installer if/when the curtain is twisted about its roll axis 76. As shown in FIG. 4B, when the inflatable curtain 14 is properly rolled, i.e., without twisting, the indicia 60 extends substantially parallel to the roll axis 76. Confronted with this indication, the installer then proceeds to installing the rolled inflatable curtain 14 in the cover 44 and ultimately securing the module 50 to the vehicle 12.

Figure 4C:
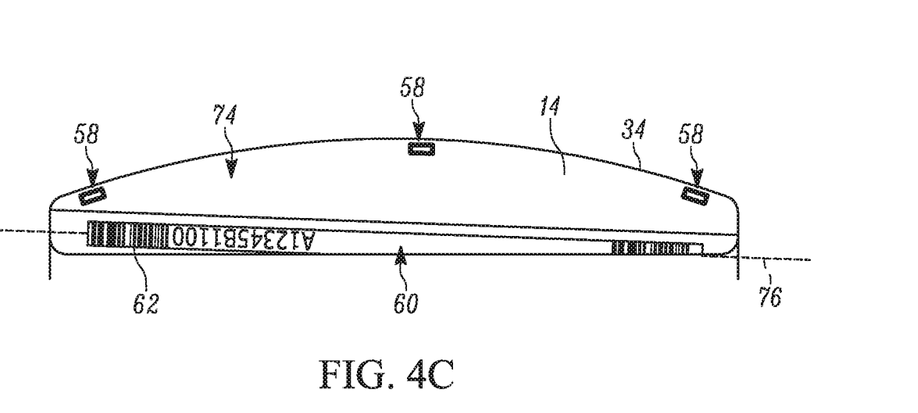
FIG. 4C is a front view of the rolled apparatus in a twisted condition.

On the other hand, when the inflatable curtain 14 is twisted about its roll axis 76 as shown in FIG. 4C, the indicia 60 also twists about the axis, e.g., helically winds about axis. Consequently, the indicia 60 does not extend substantially parallel to the roll axis 76. In response to this indication, the installer unrolls and rerolls the inflatable curtain 14 until the configuration shown in FIG. 4B is achieved. The installer then proceeds to installing the rolled inflatable curtain 14 in the cover 44 and ultimately securing the module 50 to the vehicle 12.

When the inflatable curtain 14 is pre-rolled correctly and provided to an installer, the indicia 60 can indicate to the installer when the pre-rolled inflatable curtain is twisted about the roll axis 76. This can occur, for example, during transport, handling, and/or storage of the pre-rolled inflatable curtain 14. In response, the installer can untwist the rolled inflatable curtain 14 and place the untwisted inflatable curtain in the cover 44 and ultimately install the module 50 in the vehicle 12.

Figure 5:
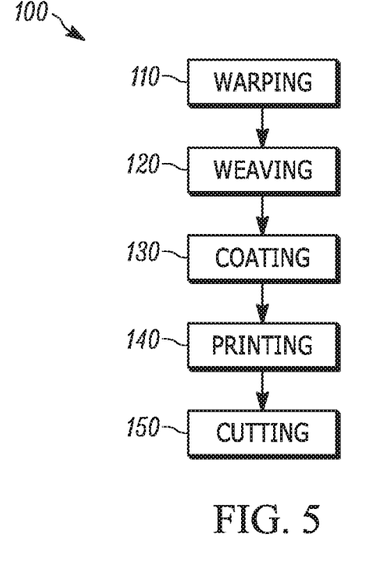
FIG. 5 is a flow chart illustrating a method of forming the curtain airbag of FIG. 2.

In one example method 100 shown in FIG. 5 for forming the inflatable curtain 14, at step 110, the yarns are warped before being woven on a loom at step 120 to form a roll 180 (shown unfurled in FIG. 6) having an OPW construction. The OPW inflatable curtain 14 can be woven using known weaving techniques, e.g., water jet weaving, Jacquard rapier weaving or Jacquard air-jet weaving. The roll 180 can be in its loom state or sized/scoured at this point. At step 130, the woven roll 130 can be coated and/or laminated. At step 140, the indicia 60 are printed directly onto the inboard side 72 of the inflatable curtain 14.

Figure 6:
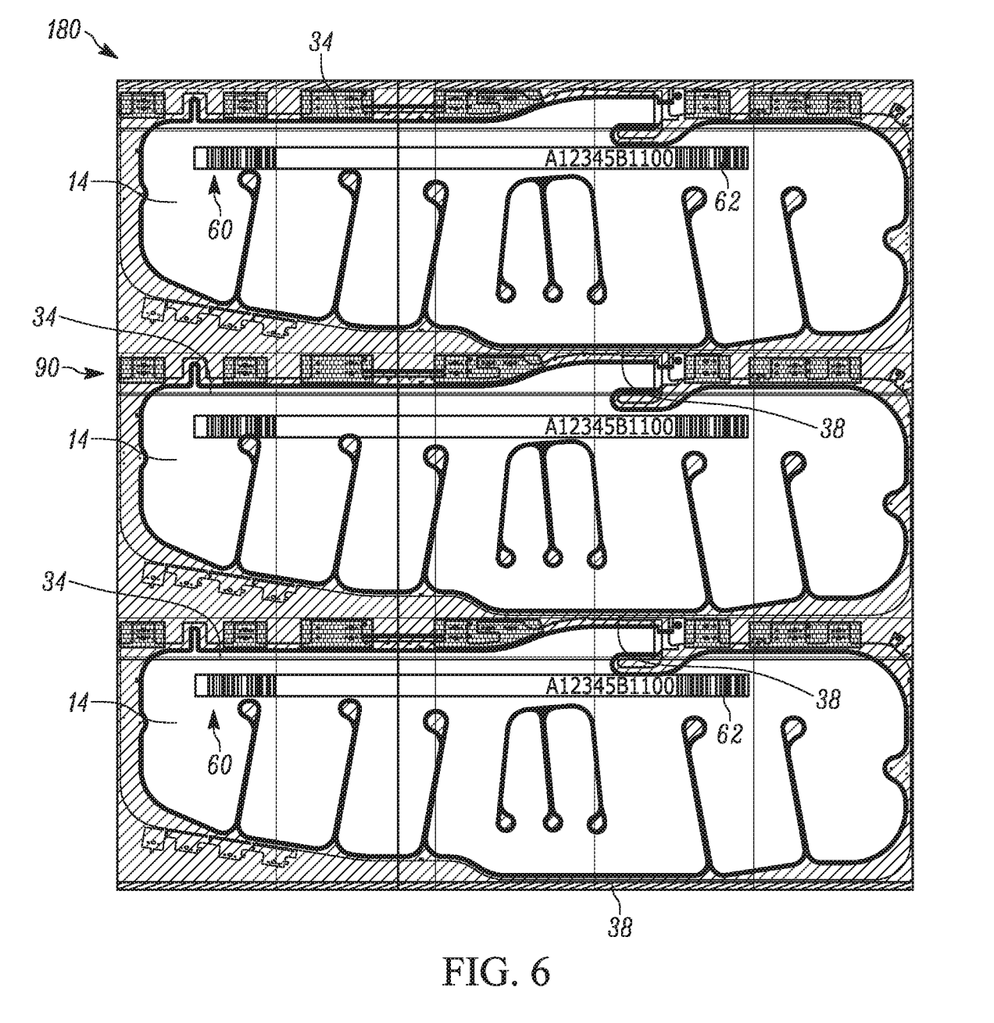
FIG. 6 illustrates an unfurled, woven roll for forming multiple curtain airbags.

It will be appreciated that the indicia 60 could alternatively or additionally be printed on the outboard side 76 of the inflatable curtain 14. If the indicia 60 is printed on both sides 72, 76, separate part numbers for the driver and passenger side of the vehicle 12 can be omitted in the indicia. It will also be appreciated that when the roll 180 includes multiple inflatable curtains 14 nested side-by-side, i.e., multiple columns as shown in FIG. 6), the curtains can be aligned such that the printer can print all the indicia 60 in each row in a single, linear path. At step 150, the unfurled roll 180 is cut to form the individual inflatable curtains 14. The cutting can be performed by a laser.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An inflatable vehicle occupant protection device, comprising:
   a curtain airbag having an upper edge portion for securing to an interior of a vehicle for deployment between a side structure of the vehicle and a vehicle occupant; and
   indicia extending along the length of the curtain airbag for indicating twisting of the curtain airbag when the curtain airbag is rolled up and/or folded along its length, the indicia including a bar code printed on the airbag fabric.

2. The inflatable vehicle occupant protection device recited in claim 1, wherein the indicia is printed on an inboard side of the curtain airbag facing an occupant of the vehicle when deployed.

3. The inflatable vehicle occupant protection device recited in claim 2, wherein the indicia indicates twisting of the curtain airbag when the curtain airbag is outboard rolled and/or folded along its length.

4. The inflatable vehicle occupant protection device recited in claim 1, wherein the indicia extends substantially parallel to the upper edge portion of the curtain airbag.

5. The inflatable vehicle occupant protection device recited in claim 1, wherein the indicia includes information for tracking the curtain airbag.

6. The inflatable vehicle occupant protection device recited in claim 1, wherein the indicia includes at least one of the length, height, and position of the curtain airbag in the vehicle.

7. The inflatable vehicle occupant protection device, recited in claim 1, wherein the curtain airbag is rolled and/or folded along an axis, the indicia extending parallel to the axis when the curtain airbag is properly rolled and being helically wound around the axis when the curtain airbag is improperly rolled.

8. A method of installing an inflatable vehicle occupant protection device in a vehicle, comprising:
   providing a curtain airbag having a length and indicia extending along the length;
   rolling and/or folding the curtain airbag about an axis;
   determining an orientation of the indicia on the rolled and/or folded curtain airbag relative to the axis;
   installing the rolled and/or folded curtain airbag in the vehicle when the indicia extends parallel to the axis; and
   unrolling and/or unfolding and rerolling and/or refolding the curtain airbag about the axis when the indicia is helically wound around the axis.

9. A method of installing an inflatable vehicle occupant protection device in a vehicle, comprising:
   providing a curtain airbag having a length and indicia extending along the length;
   rolling and/or folding the curtain airbag about an axis;
   determining an orientation of the indicia on the rolled and/or folded curtain airbag relative to the axis; and
   installing the rolled and/or folded curtain airbag in the vehicle when the indicia extends parallel to the axis, wherein the indicia is provided on an inboard side of the curtain airbag and the curtain airbag is outboard rolled and/or folded about the axis.

10. A method of installing an inflatable vehicle occupant protection device in a vehicle, comprising:
    providing a curtain airbag having a length and indicia extending along the length;
    rolling and/or folding the curtain airbag about an axis;
    determining an orientation of the indicia on the rolled and/or folded curtain airbag relative to the axis; and
    installing the rolled and/or folded curtain airbag in the vehicle when the indicia extends parallel to the axis, wherein the indicia includes a bar code printed on the airbag.

* * * * *